United States Patent [19]
Kolomeitsev et al.

[11] Patent Number: 6,127,754
[45] Date of Patent: Oct. 3, 2000

[54] MASTER SYNCHRONIZER MOTOR

[75] Inventors: Sergei Fillipovich Kolomeitsev, Sylvania; David Alan Dennis, Maumee, both of Ohio

[73] Assignee: Dana Corporation, Toledo, Ohio

[21] Appl. No.: 09/050,726

[22] Filed: Mar. 30, 1998

[51] Int. Cl.[7] .................................................. H02K 7/10
[52] U.S. Cl. ........................... 310/75 R; 310/92; 318/701
[58] Field of Search .................................. 310/75 R, 115, 310/102 R, 92, 103–105; 180/65.2, 65.7; 318/587, 701; 192/31; 477/87, 179; 290/5

[56] References Cited

U.S. PATENT DOCUMENTS

| | | | |
|---|---|---|---|
| 1,171,134 | 2/1916 | Neuland | 310/106 |
| 1,171,351 | 2/1916 | Neuland | 310/103 |
| 1,246,643 | 11/1917 | Neuland | 290/5 |
| 1,422,243 | 11/1922 | Van Norden | 310/103 |
| 1,794,613 | 3/1931 | Heany | 290/22 |
| 3,301,091 | 1/1967 | Reese | 74/640 |
| 3,391,289 | 7/1968 | Danilewicz et al. | 310/37 |
| 4,137,473 | 1/1979 | Pfister | 310/98 |
| 4,442,396 | 4/1984 | Hucker | 322/21 |
| 4,644,206 | 2/1987 | Smith | 310/115 |
| 4,958,095 | 9/1990 | Uchida et al. | 310/59 |
| 4,982,123 | 1/1991 | Raad | 310/68 D |
| 4,990,809 | 2/1991 | Artus et al. | 310/192 |
| 5,006,781 | 4/1991 | Schultz et al. | 322/25 |
| 5,012,177 | 4/1991 | Dhyanchand et al. | 322/10 |
| 5,083,273 | 1/1992 | Nishiwaki et al. | 701/68 |
| 5,089,964 | 2/1992 | Morishige et al. | 701/51 |
| 5,094,333 | 3/1992 | Mimura | 192/84.1 |
| 5,168,208 | 12/1992 | Schultz et al. | 322/25 |
| 5,204,604 | 4/1993 | Radun | 318/701 |
| 5,379,217 | 1/1995 | Mimura | 701/68 |
| 5,381,081 | 1/1995 | Radun | 322/94 |
| 5,390,068 | 2/1995 | Schultz et al. | 361/95 |
| 5,404,091 | 4/1995 | Radun | 322/94 |
| 5,442,250 | 8/1995 | Stridsberg | 310/186 |
| 5,489,001 | 2/1996 | Yang | 180/65.2 |
| 5,565,723 | 10/1996 | Dastidar | 310/103 |
| 5,833,564 | 11/1998 | Harris | 475/149 |

FOREIGN PATENT DOCUMENTS

WO95/23287  8/1995  WIPO .

*Primary Examiner*—Thomas M. Dougherty
*Assistant Examiner*—Joseph Wak
*Attorney, Agent, or Firm*—Dykema Gossett PLLC

[57] ABSTRACT

A vehicle control device is provided that is capable of functioning as a transmission synchronizer, an electromagnetic clutch, a starter for an engine, and a generator. The device includes a first member having a plurality of inwardly extending poles and a plurality of coils that are wound upon the poles. The first member is connected to an engine output shaft for rotation therewith. The device also includes a second member that is disposed within the first member. The second member is connected to a transmission input shaft for rotation therewith. Finally, the device includes means for energizing the coils of the first member to control the operation of the control device. By controlling the energization of the coils and the relative motion of the first and second members, the control device can be used as a transmission synchronizer, a clutch, a starter for the vehicle's engine, and a generator for the vehicle's battery.

28 Claims, 10 Drawing Sheets

MASTER SYNCHRONIZER MOTOR

BACKGROUND OF THE INVENTION

1. Field of the Invention

This invention relates to vehicle control devices and, more particularly, to a multi-purpose vehicle control device that is capable of functioning as an electromagnetic clutch, a transmission synchronizer, an engine starter, and a generator.

2. Disclosure of Related Art

A conventional vehicle includes an internal combustion engine, a transmission, and one or more of the following vehicle components: a clutch, mechanical synchronizers in the transmission, a starter for the engine, and an alternator. Each vehicle component is typically designed to perform only a single function (e.g., the starter starts the engine). Therefore, conventional vehicles are required to include a large number of components that increase the cost, size, and complexity of the vehicle.

One of the components—the clutch—suffers from its own particular deficiency. A conventional clutch includes a first component connected to an output shaft of the engine and a second component connected to an input shaft of the transmission. The clutch transmits torque from the engine to the transmission by frictional engagement of the two components. This type of engagement results in continuous wear on the components of the clutch and requires repeated repairs to the clutch.

There is thus a need for a vehicle component that will minimize or eliminate one or more of the above-mentioned deficiencies.

SUMMARY OF THE INVENTION

The present invention provides a multi-purpose vehicle control device.

An object of the present invention is to provide a vehicle control device that is capable of functioning as a clutch, a synchronizer, an engine starter, and a generator.

Another object of the present invention is to provide a vehicle control device that transmits torque from the engine to the transmission through electromagnetic engagement rather than frictional engagement.

A multi-purpose vehicle control device in accordance with the present invention includes a first member coupled to a vehicle engine output shaft for rotation therewith and a second member coupled to a vehicle transmission input shaft for rotation therewith. The first member may be similar to a stator in a variable reluctance motor and the engine output shaft may be coupled to a vehicle engine crankshaft. The second member may be similar to a rotor in a variable reluctance motor and the transmission input shaft may be coupled to a vehicle transmission. One of the first and second members includes a plurality of poles and a coil wound about preselected ones of the plurality of poles. The inventive control device also includes means for energizing the coil in accordance with predetermined operating strategies. By controlling the electrical excitation of the coil and the relative mechanical motion of the first and second members, the inventive vehicle control device is capable of performing the functions of a clutch, a synchronizer, a starter, and a generator.

The inventive control device can be used as both a clutch and a synchronizer by determining the rotational speed of the engine output shaft and then controlling a current in the coil of the vehicle control device to thereby control the rotational speed of the second member and the transmission input shaft relative to the rotational speed of the first member and the engine output shaft.

The inventive control device can be used as a starter by restraining the second member from rotating and controlling a current in the coil of the vehicle control device. The current generates an electromagnetic field, and thus a torque is imparted to the first member and engine output shaft as in a conventional starter.

Finally, the inventive control device can also be used as a generator, using the mechanical power delivered by the engine to develop current to be directed back into the system (e.g., the vehicle battery).

In addition to accomplishing the aforementioned objects, a vehicle control device in accordance with the present invention has several advantages over conventional vehicle control devices.

First, the inventive control device is capable of providing inching capability equivalent to that of a torque convertor.

Second, the inventive control device is capable of providing electromagnetic torsional damping with respect to the engine shaft and transmission shaft.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
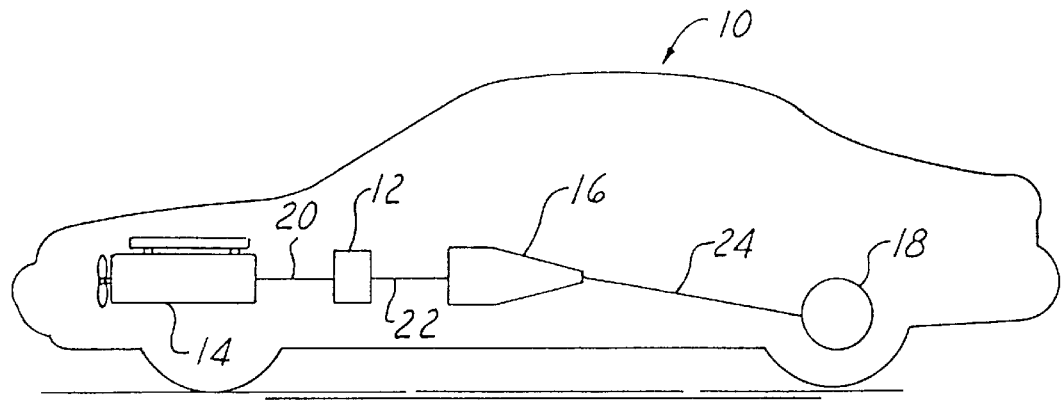
FIG. 1 is a simplified diagrammatic view of a vehicle having a vehicle control device in accordance with the present invention.

Referring now to the drawings wherein like reference numerals are used to identify identical components in the various views, FIG. 1 illustrates a vehicle 10 incorporating the inventive vehicle control device 12, an internal combustion engine 14, a transmission 16, and wheels 18 (only one is shown for clarity). Although vehicle 10 comprises a car in the illustrated embodiment, it should be understood that vehicle 10 could take on a plurality of well-known forms. In a preferred embodiment, for example, vehicle 10 comprises a class 8 truck.

Control device 12 is provided to perform a plurality of functions within vehicle 10. As described in greater detail hereinbelow, control device 12 functions as an electromagnetic clutch, a transmission synchronizer, a starter for engine 14, and a generator.

Engine 14 is provided to generate torque that is transmitted through an engine output shaft 20 extending from engine 14. Engine 14 is conventional in the art any make take any one of a plurality of forms well-known in the art. For example, engine 14 may comprise a diesel engine.

Transmission 16 is provided to control the rotation of an axle connected to wheels 18 by way of conventional drive line components (not shown) and, therefore, the rotation of wheels 18. Transmission 16 receives an input torque through a transmission input shaft 22 and transmits an output torque, responsive to the input torque, through a transmission output shaft 24. Input shaft 22 may be about 2.0 inches in diameter in one embodiment. Like engine 14, transmission 16 may be conventional in the art and may take any one of a plurality of forms well-known in the art. However, as described below, the present invention provides the capability of employing an otherwise conventional transmission but without expensive mechanical synchronizers.

Figure 2:
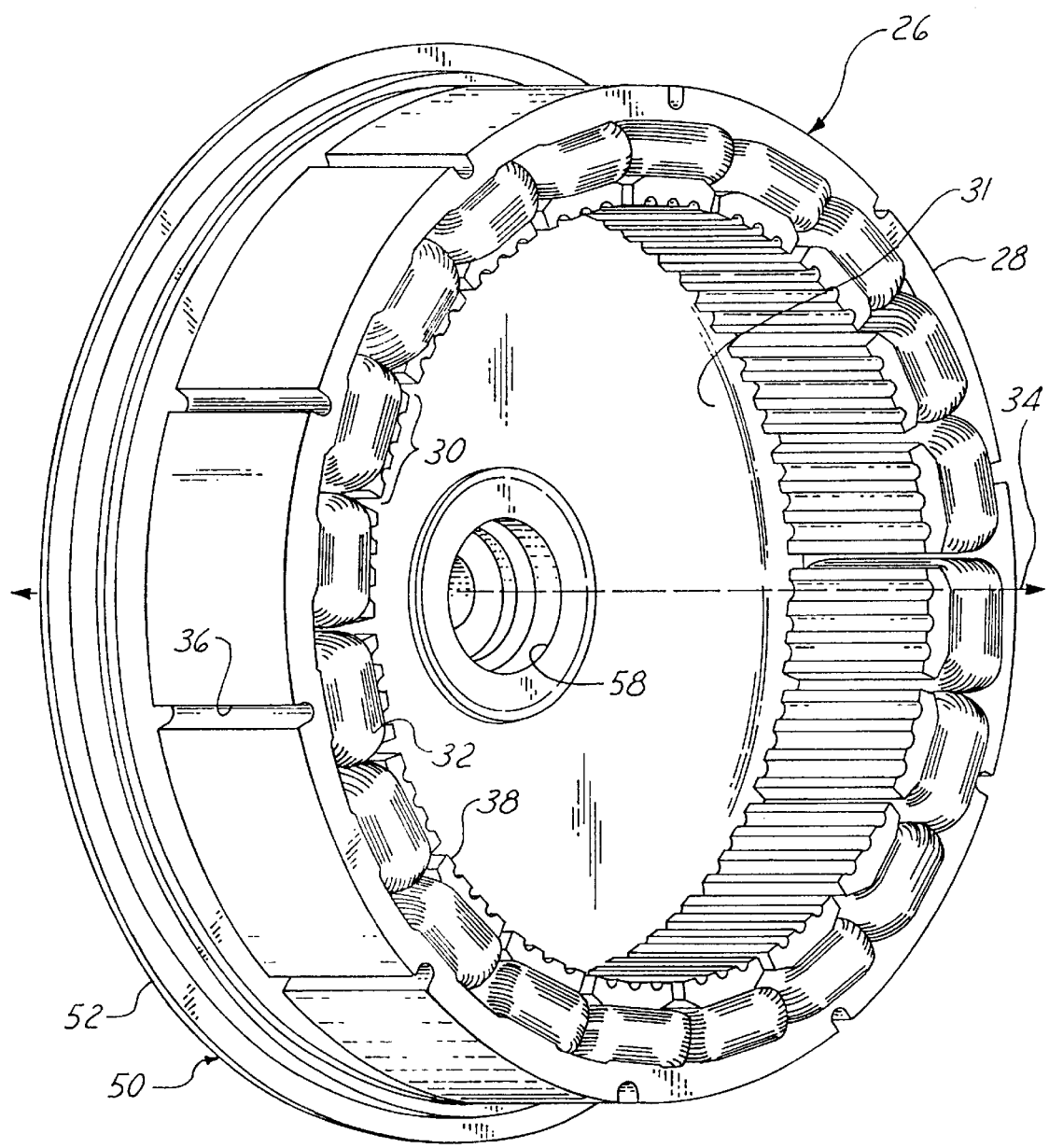
FIG. 2 is a perspective view of a first member of a vehicle control device in accordance with the present invention.
Figure 3:
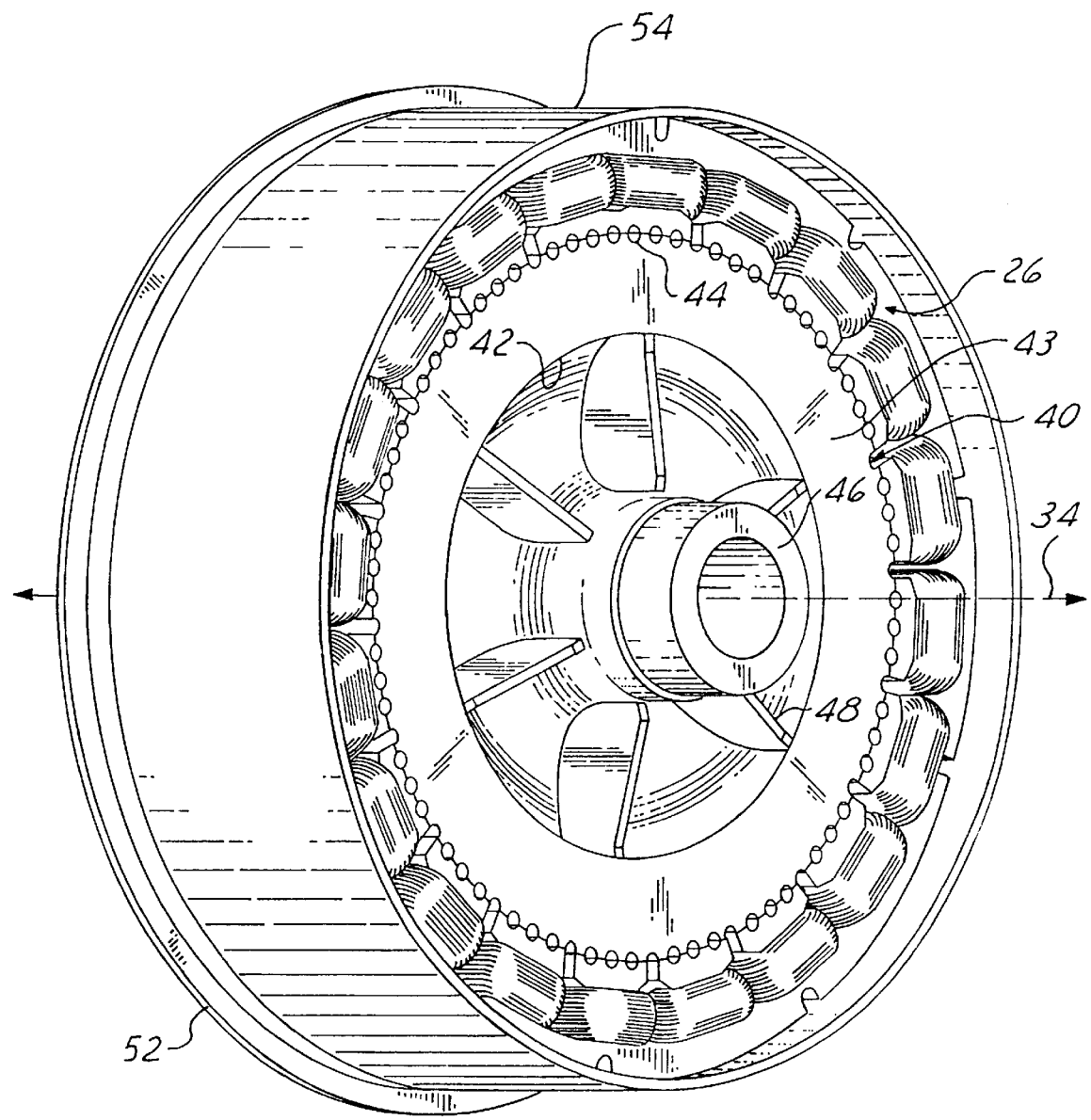
FIG. 3 is a perspective view of both a first member and a second member of a vehicle control device in accordance with the present invention.
Figure 4:
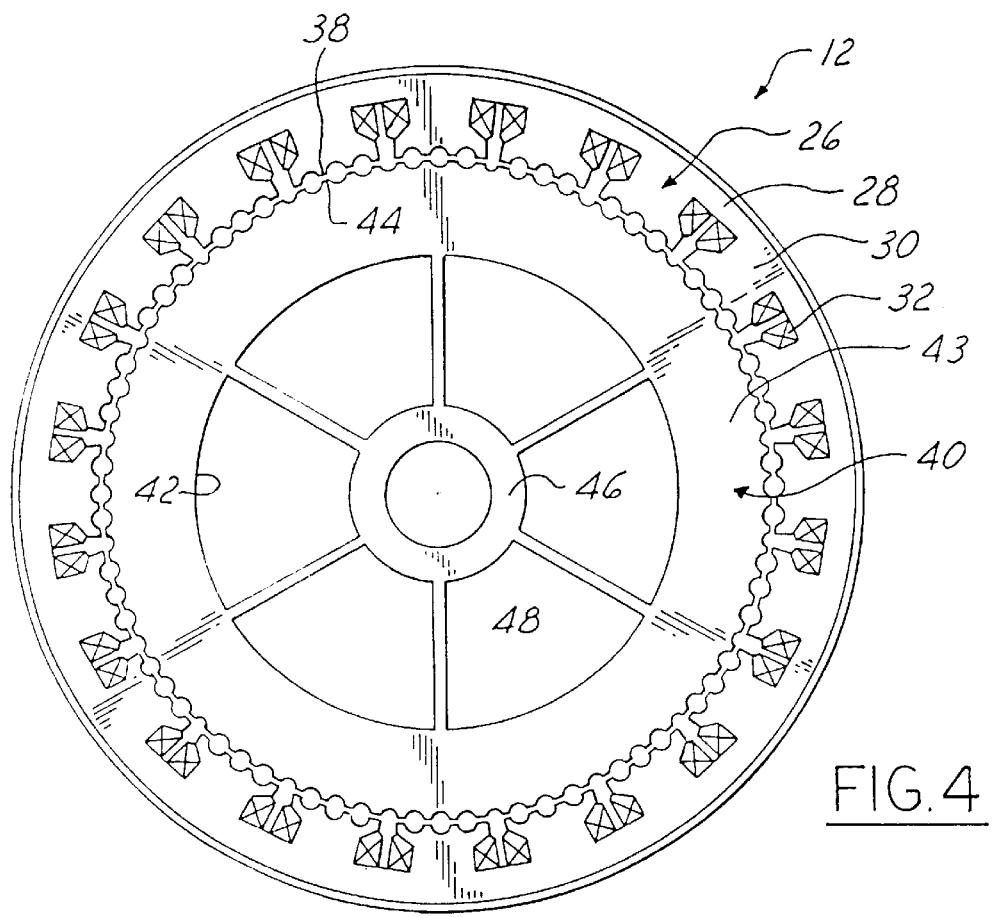
FIG. 4 is a cross-sectional view of the vehicle control device of FIG. 3.

Referring now to FIGS. 2–4, control device 12 will be described in greater detail. As illustrated in FIG. 2, control device 12 includes a first member 26 that may be coupled to engine input shaft 20 for rotation therewith. Member 26 includes a body portion 28, a plurality of poles 30 inwardly extending from body potion 28 (best shown in FIG. 4), and a plurality of coils 32 wound about preselected ones of poles 30. Member 26 is centered about an axis 34 and has an axially extending central bore 31.

Body portion 28 is provided to support poles 30 and to maintain poles 30 in proper alignment. Portion 28 and poles 30 are preferably formed of a plurality of laminations of a conventional ferromagnetic material. Portion 28 is generally annular with respect to axis 34. Portion 28 further includes a plurality of grooves 36 along its outer radial periphery.

Poles 30 are provided to create a predetermined and desired path for the transfer of magnetic flux resulting from the passage of a current through coils 32. As best illustrated in FIG. 4, each pole 30 includes a plurality of inwardly extending teeth 38. In the illustrated embodiment, member 26 includes 80 teeth. It should be noted, however, that member 26 may include varying numbers of teeth 38. In one embodiment of the present invention, the radial distance from axis 34 to the innermost tip of any one tooth 38 may be about 55.5 millimeters. Therefore, a first diameter associated with member 26 may be about 111.0 millimeters across bore 31 from one tooth 38 to another tooth 38.

Coils 32 are provided to generate an electromagnetic field in and about poles 30—and magnetic flux within poles 30—when a current is supplied to coils 32. Coils 32 may be made from conventional electrically conductive materials such as copper. Coils 32 may be wound around preselected ones of poles 30 in a conventional manner to define a first machine operating phase ("single phase arrangement"), or first and second machine operating phases ("two-phase arrangement"). The single phase arrangement provides a higher torque when operating device 12 as a clutch or synchronizer as described hereinbelow. The two-phase arrangement has the advantage, however, of dampening torsional vibrations in engine output shaft 20 when engine 14 is started. The two-phase arrangement also provides inching capability to the system similar to that of a torque convertor because the magnitude of the current in the coils 32 of each phase can be varied to produce small, incremental movements of member 26 relative to a second member 40 described hereinbelow.

Referring now to FIG. 3, control device 12 further includes a second member 40 that is disposed within central bore 31 of first member 26. Second member 40 may be coupled to transmission input shaft 24 for rotation therewith. Like member 26, member 40 is preferably formed of a plurality of laminations of a conventional ferromagnetic material.

Member 40 is substantially annular and is centered about axis 34. Member 40 may measure about 60 millimeters axially along its outer radial periphery. Member 40 may include a concave recess 42 that is also centered about axis 34. In one embodiment of the present invention the diameter across recess 42 is about 95.0 millimeters. Member 40 includes a body portion 43 and a plurality of teeth 44 extending outwardly therefrom (best shown in FIG. 4). Member 40 may further include a cylindrical shaft receiver 46, and a plurality of support segments 48 that extend from receiver 46 to the outer radial periphery of recess 42.

Teeth 44 provide a predetermined and desired path for the transfer of magnetic flux from member 26 to member 40 and vice versa. As best shown in FIG. 4, teeth 44 may be evenly spaced along the outer radial periphery of member 40 and the number of teeth 44 may be equal to the number of teeth 38 of member 26. In the illustrated embodiment, member 40 includes 80 teeth. The tips of teeth 44 define a second diameter slightly smaller than the first diameter associated with member 26. In one embodiment of the present invention, this second diameter (measured from the tip of one tooth 44 to the tip of another tooth 44 across axis 34) is about 110.0 millimeters in diameter. The difference between the first and second diameters define an air gap 45 (best shown in FIG. 8). Air gap 45 is preferably a relatively short distance and in one embodiment is about 1.0 millimeters.

Receiver 46 is provided to receive transmission input shaft 22 to connect member 40 to shaft 22 for rotation therewith. Shaft 22 may be connected to receiver 46 of member 40 by a spline coupling 76 (best shown in FIG. 8). Receiver 46 is cylindrical in shape and is centered about axis 34.

Figure 5:
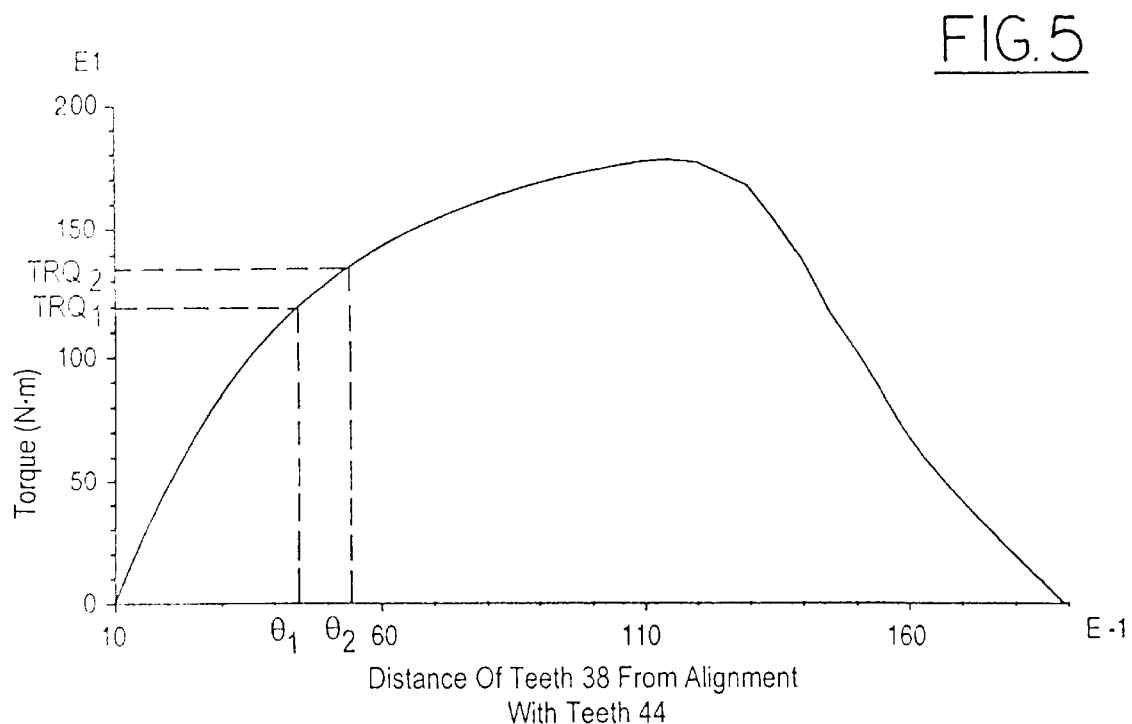
FIG. 5 is a graph illustrating the torque profile of a vehicle control device in accordance with the present invention.

Referring now to FIG. 5, a torque profile for a control device in accordance with the present invention is illustrated. FIG. 5 shows the torque generated in response to the relative positions of teeth 38 and 44 of members 26 and 40, respectively. When teeth 38 are aligned with teeth 44, as shown in FIG. 4, the torque generated is equal to about 0.0 newton-meters. As the teeth 38, 44, move out of alignment, the torque generated increases. Therefore, as each tooth 38 move $\theta_1$ degrees away from alignment with each tooth 44, an amount of torque $TRQ_1$, is generated. As each tooth 38 moves $\theta_2$ degrees away from alignment with each tooth 44, an amount of torque $TRQ_2$ is generated wherein $TRQ_2$ is greater than $TRQ_1$. The torque generated reaches a maximum value when teeth 38 and 44 are about eleven and a half (11.5) electrical degrees from the aligned position shown in FIG. 4. After that point, the torque generated decreases. In order to generate the desired torque, the level of current supplied to coils 32 is controlled. To account for inefficiencies of vehicle 10, the level of current supplied to coils 32 will typically be greater than the level of current that would be necessary to generate the desired torque in an idealized, completely efficient vehicle (i.e., the level of current supplied to coils 32 in vehicle 10 will fall within a certain "guardband" above the level of current necessary to generate the desired torque in an idealized, completely efficient vehicle).

Figure 6:
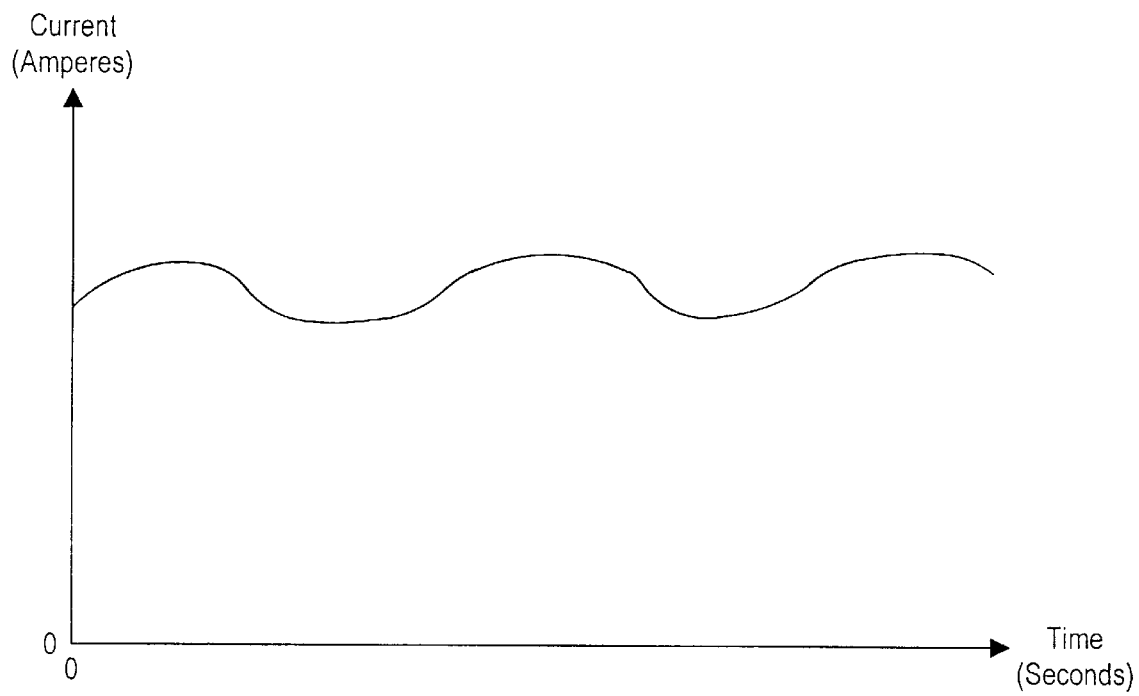
FIG. 6 is a graph illustrating the level of current supplied to the coils of a vehicle control device in accordance with the present invention.

Referring now to FIG. 6, a current profile is shown for a vehicle control device in accordance with the present invention having coils wound in a single phase arrangement. The level of current over time is responsive to the torque required by device 12 as the teeth 38 of member 26 rotate relative to teeth 44 of member 40. The current is substantially continuous and attains a maximum level when the torque required by device 12 is at a maximum level.

Figure 7:
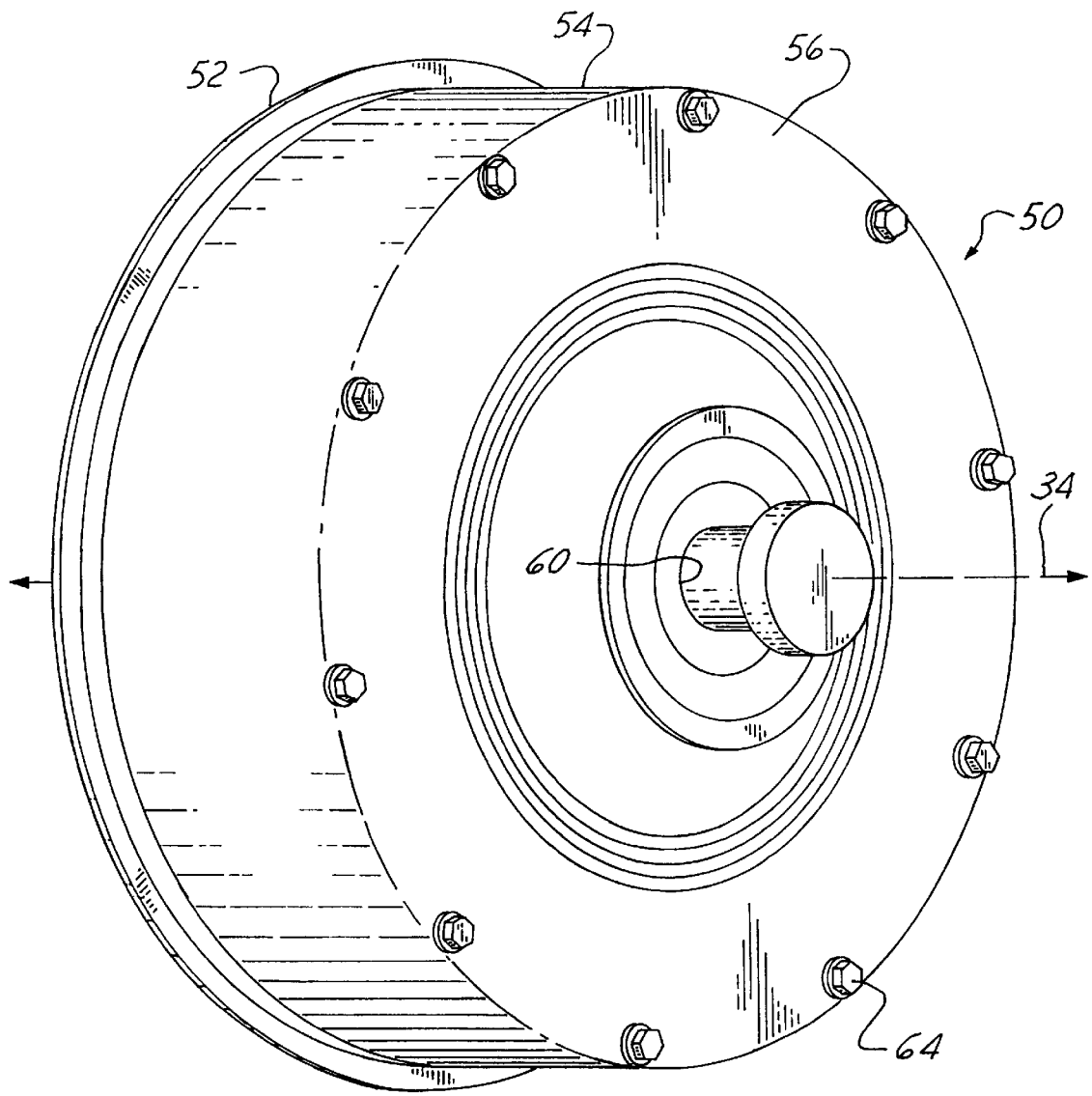
FIG. 7 is a perspective view of the vehicle control device of FIG. 3 fully enclosed within a housing.

Referring now to FIG. 7, vehicle control device 12 may also include a housing 50 disposed about members 26, 40. Housing 50 is provided to protect member 26, 40, from foreign objects and elements and may be made from any of a plurality of conventional metals or plastics. Housing 50 includes a first end cap 52, a body portion 54, and a second end cap 56. Each of end caps 52 and 56 and body portion 54 may be about 10.0 millimeters thick and end caps 52, 56, may be separated from members 26, 40 by about 30.0 millimeters (best shown in FIG. 8).

As illustrated in FIG. 2, end cap 52 is planar with respect to axis 34. End cap 52 includes an aperture 58 that is centered about axis 34. Aperture 58 is configured to receive transmission input shaft 22 as discussed in greater detail hereinbelow.

Referring again to FIG. 7, end cap 56 is also planar and is centered about axis 34. End cap 56 includes an aperture 60 through which transmission input shaft 22 extends to be received by receiver 46 of member 20. End cap 56 also includes a plurality of concentrically arranged slip rings 62, centered about axis 34. Slip rings 62 are used in a conventional manner with brushes (not shown) to impress excitation voltages and carry current from an external power source (not shown) to the coils 32 of member 26. End cap 56 may be integral with body portion 54. Fastening means, such as bolts or screws 64, may be inserted through apertures (not shown) in cap 56, grooves 36 in member 26, and apertures (not shown) in cap 52, to secure body portion 54 and cap 56 to cap 52.

Figure 8:
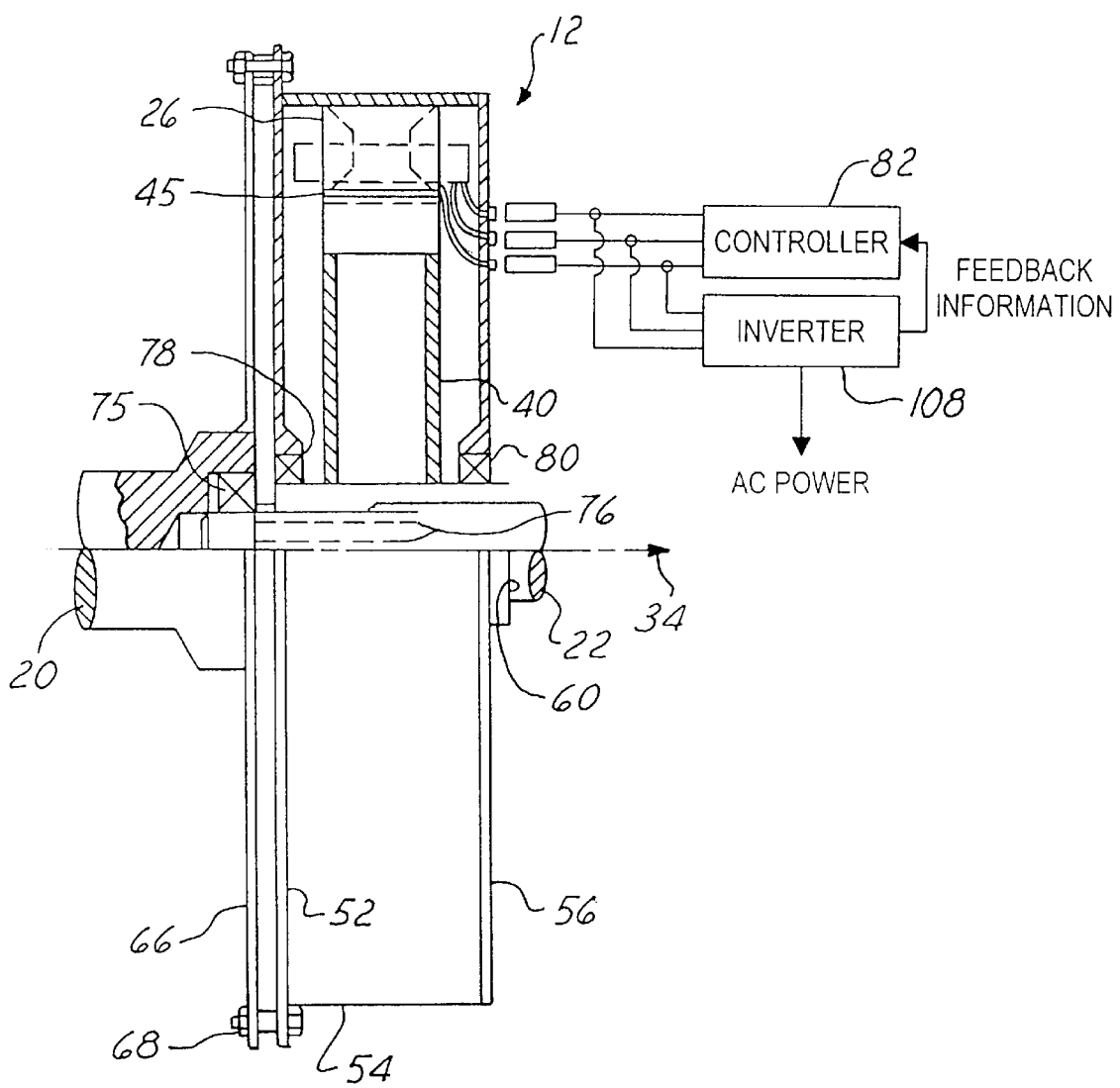
FIG. 8 is an enlarged cross sectional view of a vehicle control device in accordance with the present invention.

Referring now to FIG. 8, the relationship of vehicle control device 12 within vehicle 10 will be described in greater detail.

First member 26 is connected to engine output shaft 20 by housing 50 and a flex plate 66 that is disposed between member 26 and shaft 20. In particular, first member 26 is connected to portion 54 of housing 50. End cap 52 of housing 50 is then connected to plate 66 by fastening means, such as bolts or screws 68. Finally, shaft 20 is connected to plate 66.

Figure 9:
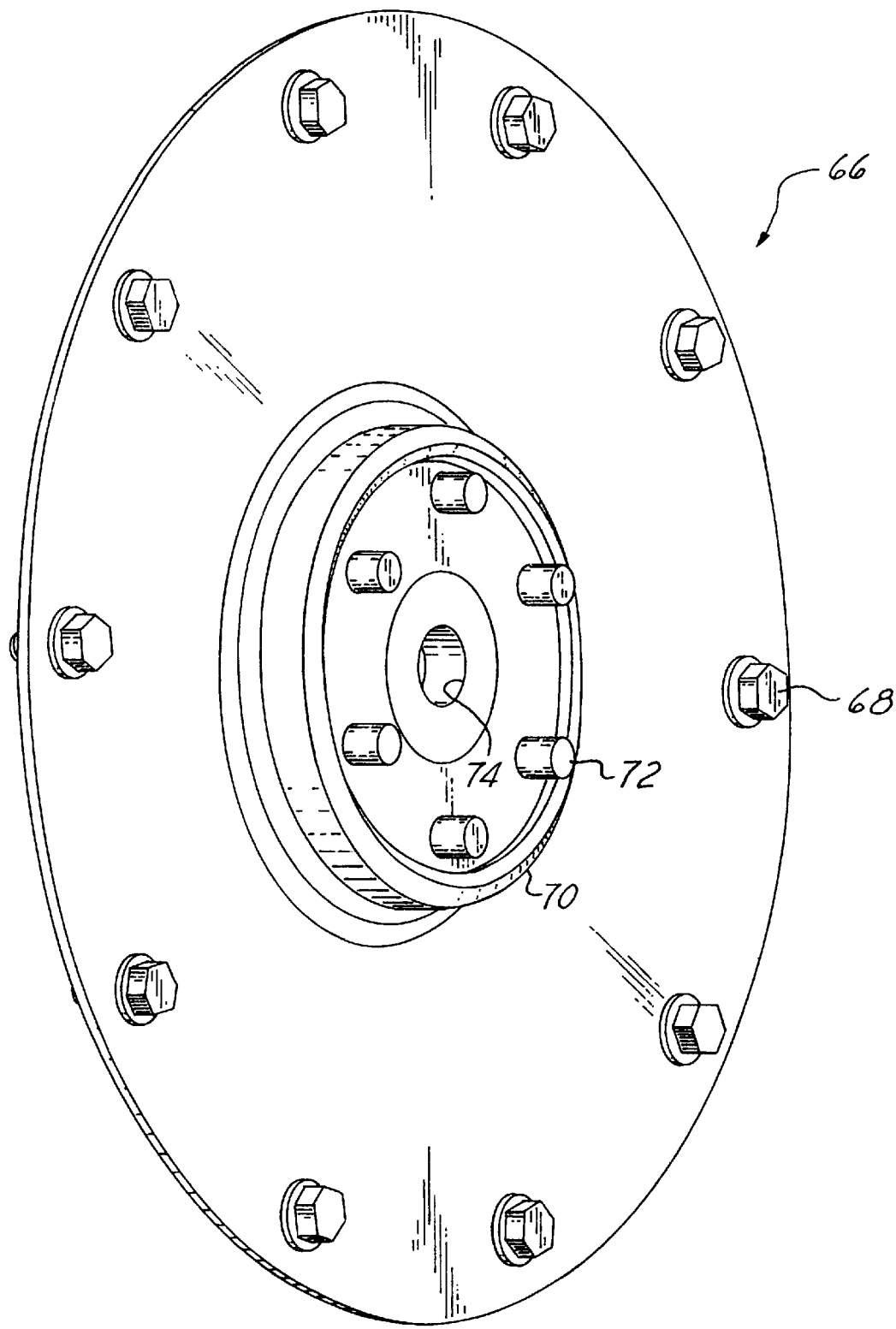
FIG. 9 is a perspective view of a flex plate used in a vehicle control device in accordance with the present invention.

Flex plate 66 is illustrated in greater detail in FIG. 9. Plate 66 is provided for "soft" coupling of shafts 20 and 22. Plate 66 may be made from soft slate. Plate 66 is substantially annular and is centered about axis 34 once it is secured to housing 50 (as shown in FIG. 8). Plate 66 includes an annular, raised portion 70. Portion 70 is centered about axis 34 has a plurality of extensions 72 extending therefrom and an aperture 74 which is also centered about axis 34. Extensions 72 are configured for insertion within blind bores (not shown) in engine output shaft 20. Bearings 75 (best shown in FIG. 8) are disposed within aperture 74 to support transmission input shaft 22. Flex plate 66 is about 5.0 millimeters thick and is separated from end cap 52 of housing 50 by about 10.0 millimeters.

Referring again to FIG. 8, member 40 is connected to transmission input shaft 22 by spline coupling 76. Shaft 22 extends through aperture 60 of end cap 56, receiver 46 of member 40, and aperture 58 of end cap 52. Member 40 and shaft 22 are supported for rotation within housing 50 by bearings 78, 80, respectively.

Control device 12 may also include means for energizing coils 32 of member 26 in accordance with predetermined operating strategies. The energizing means may include conventional phase circuitry such as phase circuit 84 of FIGS. 12 and 13 (described in greater detail hereinbelow) and means, such as controller 82, for controlling a current in coils 32.

By controlling the energization of coils 32 and the relative mechanical motion of members 26 and 40, control device 12 can accomplish the functions of a plurality of conventional vehicle components. In particular, device 12 can function as (1) an electromagnetic clutch, (2) a transmission synchronizer, (3) a starter for engine 14, and (4) a generator. Each of these functions will now be discussed in turn.

1. Clutch

Figure 10:
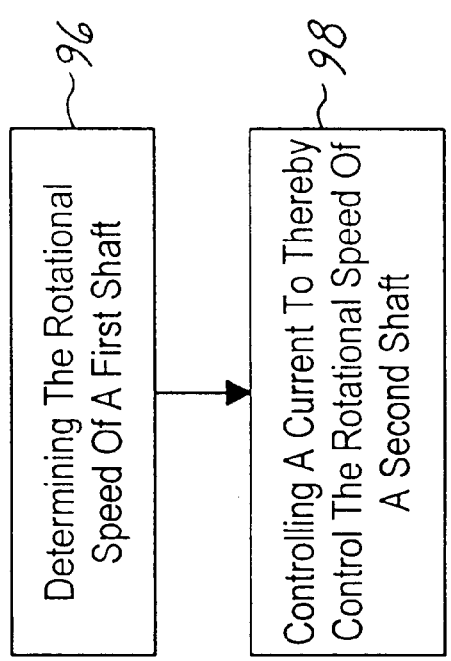

A control device in accordance with the present invention can function as an electromagnetic clutch. The flowchart diagram of FIG. 10 describes a method of operating vehicle 10 using device 12 as a clutch. The first step 96 in such a method is to determine the rotational speed of engine output shaft 20. Step 96 may be performed in a conventional manner by a sensor or other means for measuring rotational speed. The second step 98 is to control a current within coils 32 of member 26 to thereby control the rotational speed of member 40 and shaft 22 relative to the rotational speed of member 26 and shaft 20. In particular, controller 82 controls the current such that a torque is generated sufficient to cause member 40 and transmission input shaft 22 to rotate at a speed equal to the rotational speed of member 26 and engine output shaft 20. The current provided to coils 32 is substantially continuous. It should be noted that, if coils 32 are wound in two-phase arrangement, only one phase may be supplied current while device 12 operates as a clutch.

A control device functioning as a electromagnetic clutch in accordance with the present invention represents a significant improvement over conventional clutches that rely on frictional engagement of two components within the clutch. The friction bearing components of conventional clutches suffer from continuous wear and therefore require repeated maintenance. The electromagnetic engagement—as opposed to frictional engagement—of the present invention, however, produces a clutch that requires less frequent repair and, therefore, is less costly to maintain.

2. Synchronizer

Figure 11:
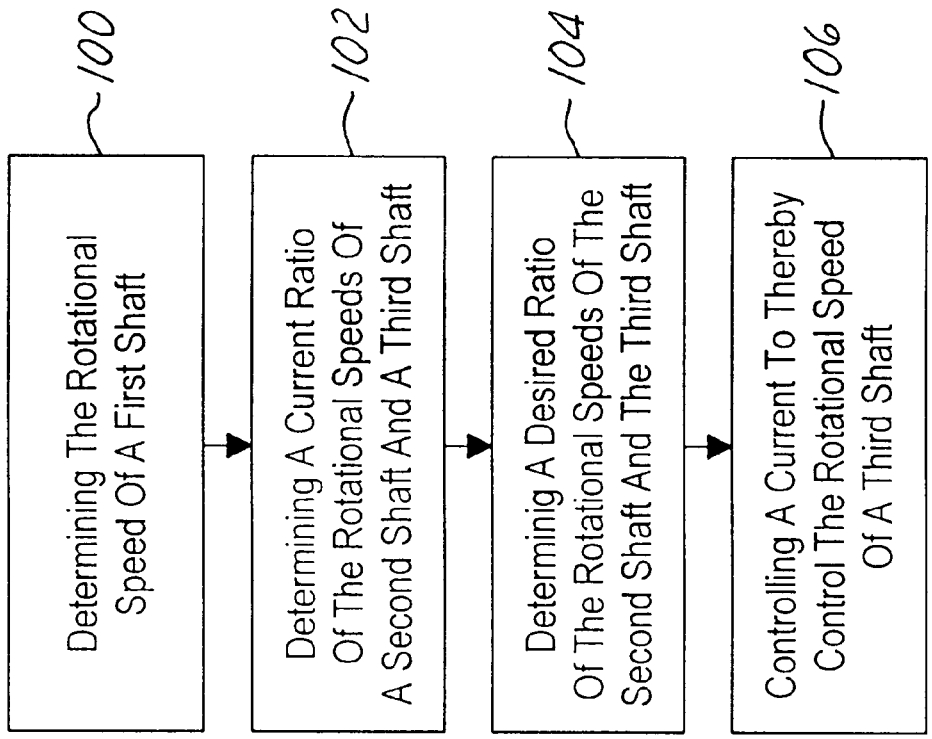
FIGS. 10 and 11 are flowchart diagrams describing a method for operating a motor vehicle using a vehicle control device in accordance with the present invention.

A control device in accordance with the present invention can also function as a transmission synchronizer. A method for operating vehicle 10 using device 12 as a synchronizer is illustrated in the flowchart diagram of FIG. 11. The first step 100 in such a method is to determine the rotational speed of engine output shaft 20. Step 100 may be performed in a conventional manner by a sensor or other means for measuring rotational speed. The next steps 102, 104, are to determine both the current and desired ratios of the rotational speed of transmission input shaft 22 relative to the rotational speed of transmission output shaft 24. Using (1) the measured rotational speed of engine input shaft 20 (which is substantially equivalent to the rotational speed of transmission input shaft 22) and (2) the current ratio of the rotational speed of transmission input shaft 22 relative to the rotational speed of transmission output shaft 24, a rotational speed of transmission output shaft 24 can be calculated. Then, using (1) the calculated rotational speed of transmission output shaft 24 and (2) the desired ratio of the rotational speed of transmission input shaft 22 relative to the rotational speed of transmission output shaft 24, a desired rotational speed for transmission input shaft 22 can be calculated. The final step 106 is to control a current in coils 32 to thereby control the rotational speed of transmission input shaft 22 relative to the rotational speed of engine output shaft 20. In particular, controller 82 controls the current in coils 32 to speed up or slow down the rotational speed of member 40 and transmission input shaft 22 relative to the rotational speed of member 26 and engine output shaft 20 in order to effect a downshift or an upshift, respectively.

A control device functioning as a synchronizer in accordance with the present invention represents a significant improvement over conventional synchronizers that are normally housed within transmission 16. Conventional transmission synchronizers are expensive and difficult to repair. The present invention, however, eliminates the need for such synchronizers.

3. Starter

A control device in accordance with the present invention can also function as a starter for engine 14. The first step in operating device 12 as a starter for engine 14 is to prevent the rotation of member 40 and transmission input shaft 22. The rotation of member 40 and shaft 22 can be restrained by a disc brake (not shown) or other conventional means for preventing rotation. The second step is to generate a current in coils 32 of member 26. Generation of a current within coils 32 may be controlled by controller 82. Generating a current in coils 32 produces electromagnetic fields in both member 26 and member 40. The interaction of these fields produces a torque that results in mechanical motion (i.e, rotation) of member 26 and engine output shaft 20 relative to member 40 and transmission input shaft 22.

4. Generator

Figure 14:
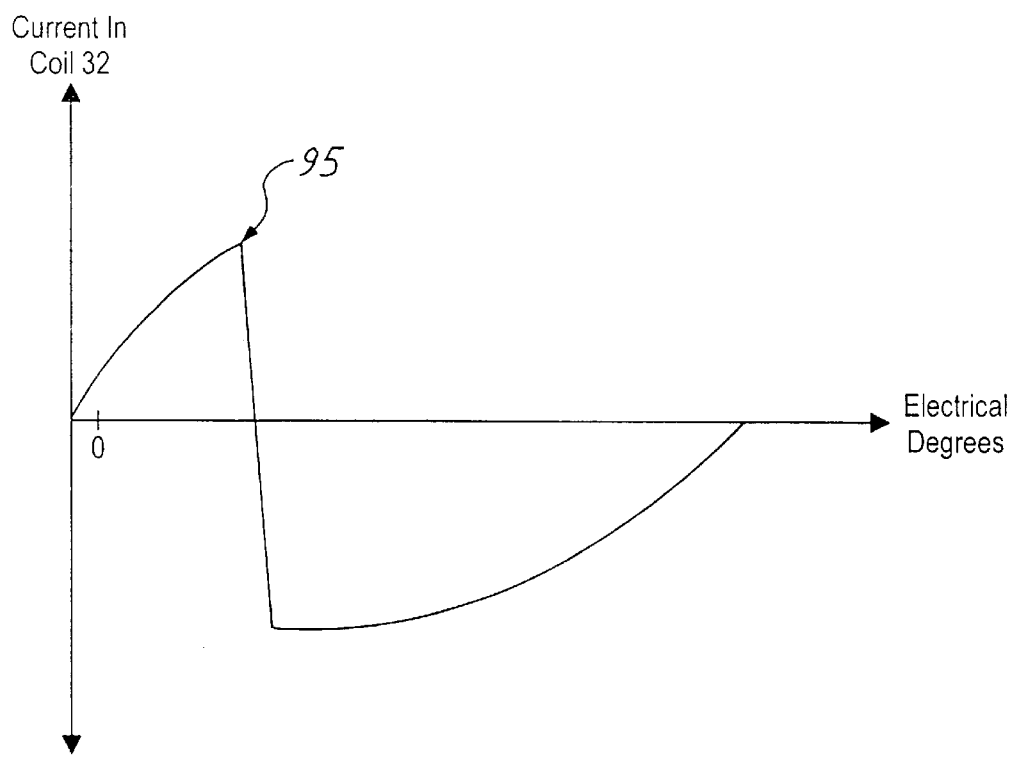
FIG. 14 is a graph illustrating the level of current within the circuit of FIGS. 12 and 13.
Figure 12:
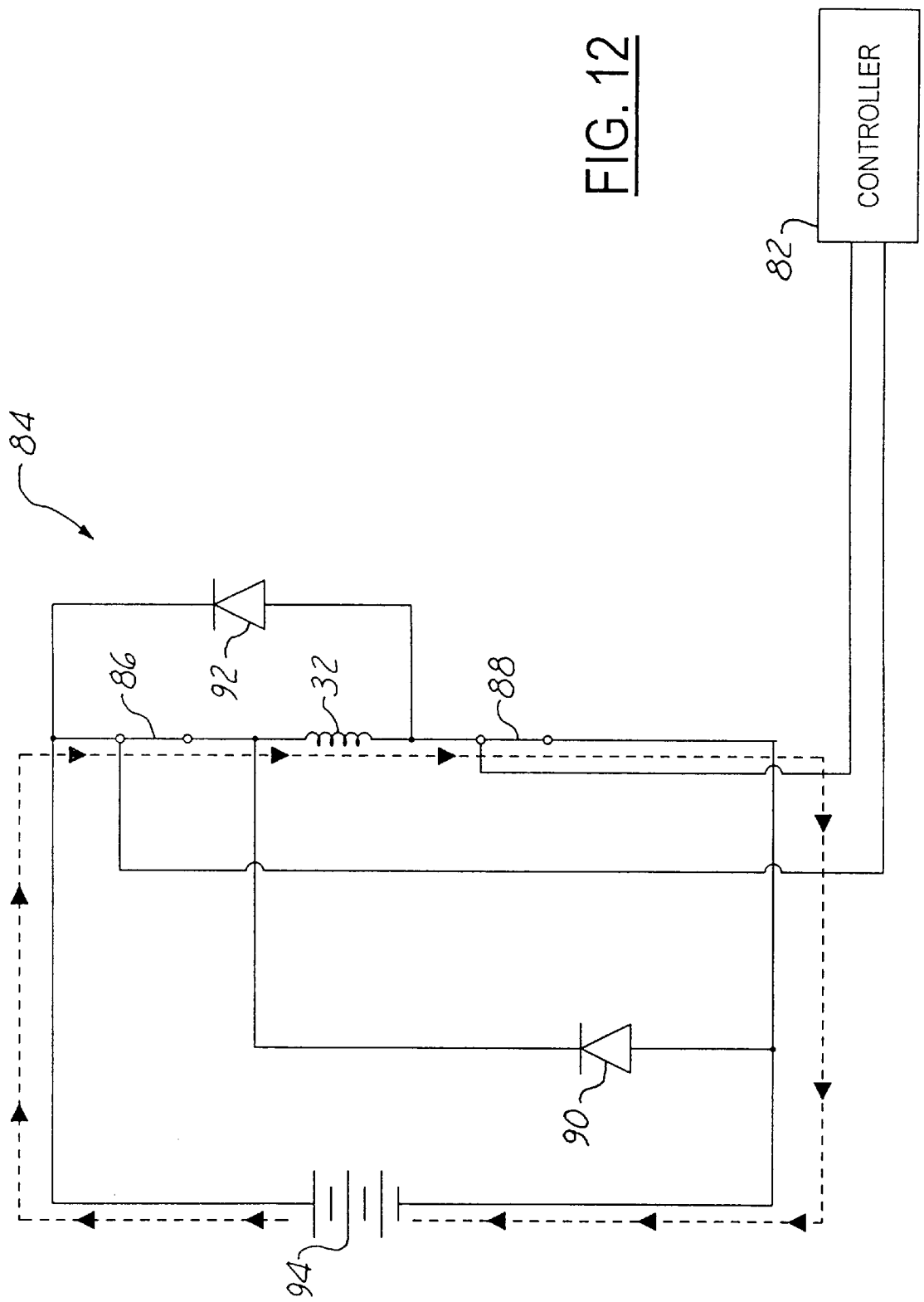
FIGS. 12 and 13 are circuit diagrams of a conventional phase circuit.
Figure 13:
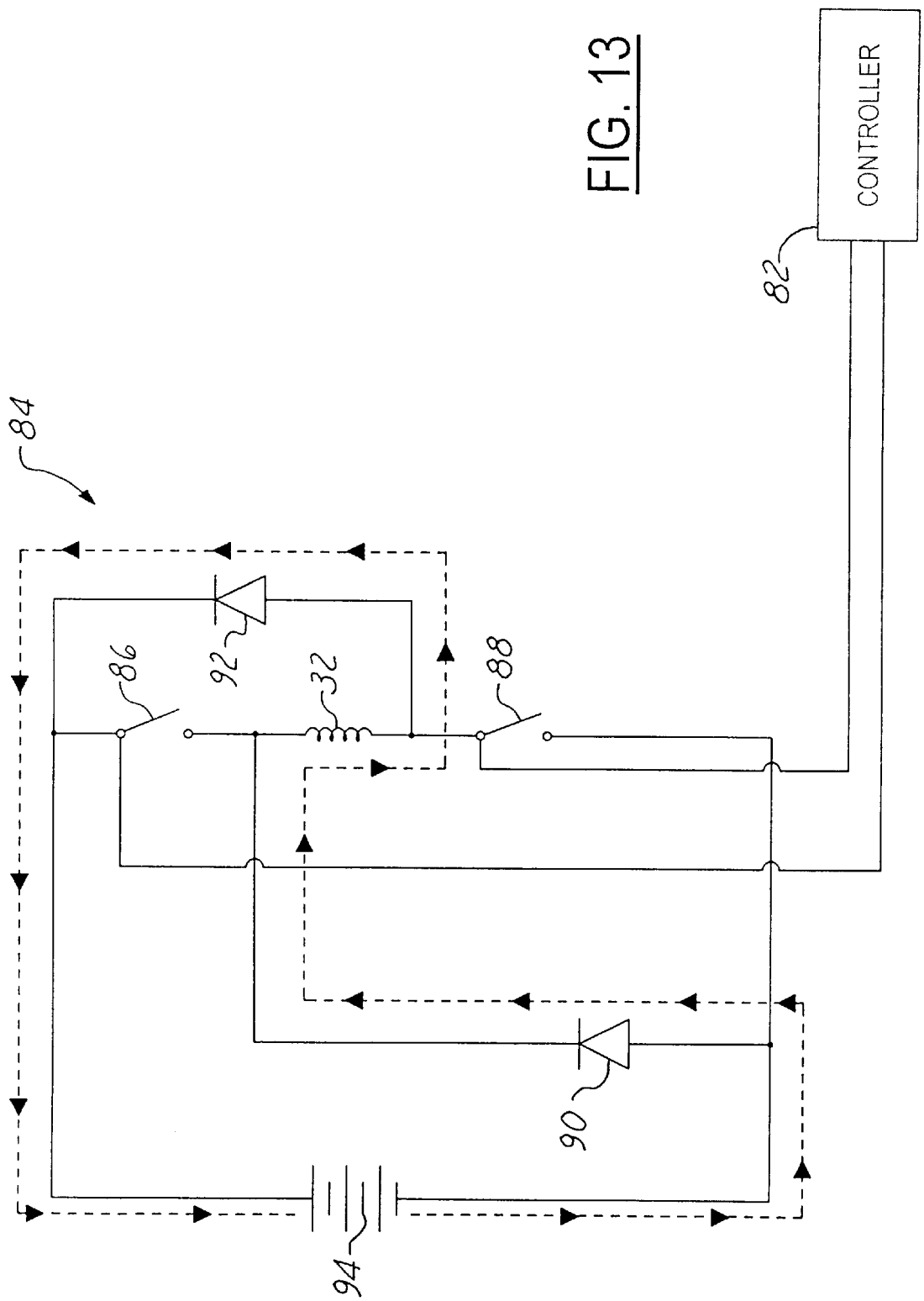

Finally, a control device in accordance with the present invention can function as a generator. FIG. 12–14 illustrate how control device 12 can use the mechanical power delivered by engine 14 to develop current to be directed back into the system (e.g., to a vehicle battery). As shown in FIG. 12 and 13 a conventional phase circuit 84 includes a coil 32, a pair of switches 86, 88, disposed on either side of coil 32, a pair of diodes 90, 92, and a power source 94 (e.g., a vehicle battery). In FIG. 12, switches 86, 88, are closed while in FIG. 13 switches 86, 88, are opened. After engine 14 is started, engine output shaft 20 and member 26 will be rotatably driven by engine 14. Transmission input shaft 22 and member 40 may then be released from their braked position. As illustrated in FIGS. 12 and 14, switches 86, 88, are initially closed and current is supplied to coil 32 as teeth 38 of member 26 move past teeth 44 of member 40. As shown in FIG. 14, current may be supplied to coils 32 before teeth 38 reach an aligned position with teeth 44 (i.e., 0 electrical degrees in FIG. 14). The mechanical motion of member 26 relative to member 40 induces additional current in coil 32. The increase in current in coil 32 induces a torque in member 40 relative to member 26. Once teeth 38 reach a predetermined position relative to teeth 44 (as measured in electrical degrees), switches 86, 88, are closed and current is directed to power source 94 along the paths shown in FIG. 13 (with the polarity of the current reversed as shown in FIG. 14 and the point at which switches 86, 88 are closed indicated at 95). Device 12 continues to generate and direct current to power source 94 in the above-described manner until member 40 and shaft 22 reach a rotational speed equal to the rotational speed of member 26 and shaft 20.

The ability of control device 12 to function as a generator can be used advantageously in a number of applications. For example, a typical firefighting vehicle requires a separate generator to provide power to many of the electrical devices used in the vehicle. This generator is bulky and adds a considerable amount of weight to the vehicle. Referring to FIG. 8, device 12 may include means, such as a conventional inverter 108, for converting a direct current received from coils 32 of device 12 into an alternating current. Current is received by inverter 108 from coils 32 in a conventional manner through slip rings 62 in combination with brushes (not shown). The alternating current produced by inverter 108 can be used to generate an AC power output that may be input to the electrical devices in the firefighting vehicle. As a result, the use of control device 12 as a generator eliminates the need for a separate generator in such a vehicle. The AC power output from inverter 108 will vary depending upon the requirements of the various electrical devices in the vehicle. Therefore, feedback information may be provided from inverter 108 to controller 82 to control the flow of current in inverter 108 and coils 32 of control device 12. It should be understood that the use of control device 12 as a generator in combination with inverter 108 is not limited to firefighting vehicles, but may be similarly used in a variety of vehicles and applications.

While the invention has been particularly shown and described with reference to the preferred embodiments thereof, it is well understood by those skilled in the art that various changes and modifications can be made in the invention without departing from the spirit and scope of the invention. For example, member 26 may be connected to transmission input shaft 22 and member 40 may be connected to engine output shaft 20. Such a configuration would remain capable of performing each of the functions described hereinabove with respect to the illustrated embodiment. Moreover, vehicle control device 12—and, in particular, members 26 and 40—may take on a plurality of conventional forms and retain the same functionality. In the embodiment described and illustrated hereinabove, members 26 and 40 are similar to a stator and rotor, respectively, of a variable reluctance motor. However, other conventional motor configurations having a stator and rotor configuration (e.g., a switched reluctance motor) could also be used while retaining the same functionality.

I claim:

1. A multi-purpose vehicle control device, comprising:
   a variable reluctance machine having
      a first member coupled to a vehicle engine output shaft for rotation therewith;
      a second member coupled to a vehicle transmission input shaft for rotation therewith,
      wherein one of said first and second members includes
         a plurality of poles and
         a first coil wound about first preselected ones of said plurality of poles; and,
   means for energizing said first coil in accordance with predetermined operating strategies.

2. The vehicle control device of claim 1 wherein said energizing means includes means for controlling a current in said first coil and wherein control of said current causes said transmission input shaft to rotate at an input speed equal to an output speed of said engine output shaft.

3. The vehicle control device of claim 1 wherein said energizing means includes means for controlling a current in said first coil and wherein control of said current causes said transmission input shaft to rotate at an input speed relative to an output speed of said engine output shaft.

4. The vehicle control device of claim 1, further comprising means for preventing the rotation of said transmission input shaft, wherein said energizing means includes means for controlling a current in said first coil and wherein control of said current causes said engine output shaft to rotate.

5. The vehicle control device of claim 1 wherein said energizing means includes means for controlling a current in said first coil and wherein control of said current directs said current to a vehicle battery.

6. The vehicle control device of claim 1 wherein said one of said first and second members includes a first plurality of teeth extending from said plurality of poles.

7. The vehicle control device of claim 6 wherein another of said first and second members includes a second plurality of teeth.

8. The vehicle control device of claim 7 wherein the number of said first plurality of teeth is equal to the number of said second plurality of teeth.

9. The vehicle control device of claim 1, further comprising a housing disposed about said first and second members, said housing including at least one slip ring.

10. The vehicle control device of claim 1, further comprising a flex plate disposed between said vehicle engine output shaft and said first member.

11. The vehicle control device of claim 10 wherein said flex plate is coupled to said vehicle engine output shaft and includes an aperture configured to receive said vehicle transmission input shaft.

12. The vehicle control device of claim 1 wherein said first coil is wound about said first preselected ones of said plurality of poles to define a first machine operating phase.

13. The vehicle control deice of claim 12, further comprising a second coil, wherein said second coil is wound about second preselected ones of said plurality of poles to define a second machine operating phase.

14. The vehicle control device of claim 1, further comprising means for converting a direct current received from said first coil into an alternating current.

15. A multi-purpose vehicle control device, comprising:
   a variable reluctance machine having
      a first member coupled to a vehicle engine output shaft for rotation therewith, said first member comprised of a plurality of laminations of a ferromagnetic material and having a plurality of inwardly extending poles and a first coil wound about first preselected ones of said plurality of poles wherein each of said plurality of poles includes a plurality of inwardly extending teeth; and,
      a second member disposed within said first member and coupled to a vehicle transmission input shaft for rotation therewith, said second member comprised of a plurality of laminations of a ferromagnetic material and having a plurality of outwardly extending teeth; and,
   means for energizing said first coil in accordance with predetermined operating strategies.

16. The vehicle control device of claim 13 wherein said energizing means includes means for controlling a current in said first coil and wherein control of said current causes said transmission input shaft to rotate at an input speed equal to an output speed of said engine output shaft.

17. The vehicle control device of claim 13 wherein said energizing means includes means for controlling a current in said first coil and wherein control of said current causes said transmission input shaft to rotate at an input speed relative to an output speed of said engine output shaft.

18. The vehicle control device of claim 15, further comprising means for preventing the rotation of said transmission input shaft, wherein said energizing means includes means for controlling a current in said first coil and wherein control of said current causes said engine output shaft to rotate.

19. The vehicle control device of claim 15 wherein said energizing means includes means for controlling a current in said first coil and wherein control of said current directs said current to a vehicle battery.

20. The vehicle control device of claim 15 wherein the number of inwardly extending teeth of said first member is equal to the number of outwardly extending teeth of said second member.

21. The vehicle control device of claim 15, further comprising a housing disposed about said first and second members, said housing including at least one slip ring.

22. The vehicle control device of claim 15, further comprising a flex plate disposed between said vehicle engine output shaft and said first member.

23. The vehicle control device of claim 15 wherein said first coil is wound about said first preselected ones of said plurality of poles to define a first machine operating phase.

24. The vehicle control device of claim 23, further comprising a second coil, wherein said second coil is wound about second preselected ones of said plurality of poles to define a second machine operating phase.

25. The vehicle control device of claim 15, further comprising means for converting a direct current received from said first coil into an alternating current.

26. A method for operating a motor vehicle, comprising the steps of:
   determining a first rotational speed of a vehicle engine output shaft, said engine output shaft being coupled to a first member of a variable reluctance machine for rotation therewith, said first member having a plurality of inwardly extending poles and a first coil wound about first preselected ones of said plurality of poles; and,
   controlling a current in said first coil to thereby control a second rotational speed of a vehicle transmission input shaft relative to said first rotational speed of said engine output shaft, said transmission input shaft being coupled to a second member of said variable reluctance machine for rotation therewith and disposed within said first member.

27. The method of claim 26, further comprising the steps of:
   determining a current ratio of said second rotational speed to a third rotational speed of a vehicle transmission output shaft; and,
   determining a desired ratio of said second rotational speed to said third rotational speed.

28. A vehicle drive-train, comprising:
   an engine having an engine output shaft;
   a transmission having a transmission input shaft;
   a variable reluctance motor having a first member connected to said engine output shaft and a second member connected to said transmission input shaft, one of said first and second members including a plurality of poles and a first coil wound about first preselected ones of said plurality of poles,
   wherein electromagnetic attraction between said first and second members is used to transmit a torque from said engine output shaft to said transmission input shaft.

* * * * *

UNITED STATES PATENT AND TRADEMARK OFFICE
CERTIFICATE OF CORRECTION

PATENT NO.   : 6,127,754
DATED        : 10-03-00
INVENTOR(S)  : Kolomeitsev et al.

It is certified that error appears in the above-identified patent and that said Letters Patent is hereby corrected as shown below:

In claim 16, line 1, please delete "13" and substitute --15-- therefor.

In claim 17, line 1, please delete "13" and substitute --15-- therefor.

Signed and Sealed this

Twenty-seventh Day of March, 2001

Attest:

NICHOLAS P. GODICI

Attesting Officer

Acting Director of the United States Patent and Trademark Office